(12) United States Patent
Van Valer

(10) Patent No.: US 6,714,209 B2
(45) Date of Patent: Mar. 30, 2004

(54) BROWSER-BASED SYSTEM PROVIDING METHODOLOGY FOR LABELING OF PHOTO COMPACT DISCS WITH A PHOTO-FACSIMILE TABLE OF CONTENTS

(75) Inventor: Andrew Van Valer, Scotts Valley, CA (US)

(73) Assignee: LightSurf Technologies, Inc., Santa Cruz, CA (US)

(*) Notice: Subject to any disclaimer, the term of this patent is extended or adjusted under 35 U.S.C. 154(b) by 279 days.

(21) Appl. No.: 09/827,521

(22) Filed: Apr. 6, 2001

(65) Prior Publication Data
US 2002/0145614 A1 Oct. 10, 2002

(51) Int. Cl.[7] .................................................. G09G 5/00
(52) U.S. Cl. ........................ 345/629; 345/636; 345/676; 345/763; 345/708
(58) Field of Search ................................ 345/629, 636, 345/676, 763, 708

(56) References Cited

FOREIGN PATENT DOCUMENTS

EP 0996036 A1 * 4/2000 .......... G03D/15/00

* cited by examiner

Primary Examiner—Matthew C. Bella
Assistant Examiner—Tam Tran
(74) Attorney, Agent, or Firm—John A. Smart

(57) ABSTRACT

A browser-based system is described that provides a methodology for labeling of photo compact discs with a photo-facsimile table of contents. The system allows a customer at an e-commerce photo Web site to easily archive multiple albums that are on-line onto a CD-ROM along with a personalized table of contents printed onto the CD itself. This provides a user-friendly index of the digital images stored on the CD, thus saving a user from having to load the CD in a CD drive to be able to determine which pictures it contains. In this manner, people having multiple photo-CDs can quickly and easily identify the particular CD that has photographs that are of interest.

51 Claims, 6 Drawing Sheets

BROWSER-BASED SYSTEM PROVIDING METHODOLOGY FOR LABELING OF PHOTO COMPACT DISCS WITH A PHOTO-FACSIMILE TABLE OF CONTENTS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to the field of digital image processing and, more particularly, to designs that enable users to archive their personal photo albums from Web-based e-commerce photo sites onto individual storage type media (e.g., disc-shaped media, such as CD-ROM, DVD, Photo CD, or the like) with a customized table of contents (TOC) imprinted onto the disc-shaped media.

2. Description of the Background Art

Consumer enthusiasm for accumulating collections of personal digital photographs has led to the popularity of temporarily storing and cataloging them as personal albums on the Web. Several commercial Internet services facilitate this activity by providing reasonable disk space for personal photo storage along with server-side Web application software for users to customize their albums, make those albums available to others on-line (sharing), and engage in further e-commerce with the providers, such as ordering printed copies.

Over time, the number of on-line albums and digital photographs belonging to a digital image enthusiast increases, as there is a limit to the commercially-available storage. Periodically, at least some of a consumer's albums are likely to be deleted from this storage. Understandably, the consumer may want to personally store some of these pictures and/or albums longer term, and in a manner to be able to view or use them without dependence upon an Internet connection. Although digital images can be copied to photographic paper, often people will want to retain their pictures in a digital format.

Typical low-bandwidth connectivity to the Internet and limited disk space on personal computers preclude the practicality for an individual downloading the pictures from the commercial Internet site for long-term storage onto a home computer. Additionally, one could want to retain some pictures for a long time, as with photographic prints—past the life expectancy of a consumer computer. The likely storage medium for very convenient, affordable, and permanent digital storage is disc-based media. Examples of disc-based media include "CD" or compact disc (including CD-ROM, CD-R, CD-RW, and Photo CD) and DVD (including DVD-ROM and DVD-RAM). New disc-based media formats are introduced to the marketplace on a routine basis. For reducing complexity of the discussion which follows, the term CD will be used to simply refer generally to all disc-based media, including all forms of compact disc-based and DVD-based media, and similar media formats.

Current consumer CD technology is very inexpensive, and the storage capacity of a single disk, several hundred megabytes (or more), is sufficient to accommodate hundreds of full-resolution images in the common JPEG format. In fact, the commercial Internet photo-hosting services already transfer a consumer's albums, or assortment of pictures, to CDs as part of their e-commerce offerings. Extrapolating from this trend, many digital photo consumers will accumulate multiple photo-storing CDs just as film-based photographers accumulate multiple shoeboxes or albums of photo prints. The digital photo collectors are facing the same dilemma encountered by analog picture owners: how to easily retrieve/review individual pictures from their personal warehouses of images. The current method for finding an individual picture in a haystack of photo-storing CDs is to individually load each CD and then to individually click on each file within to see which picture it is.

Commercial CDs, such as music CDs, are easily identifiable because they have identifying labels pre-impregnated onto the non-data side of each CD. Music CDs generally only contain less than a dozen individual recordings that are indexed (as a table of contents) either onto the non-data side of the CD itself or into the CD cover case; so the consumer can quickly scroll through such a CD to find a specific song. However, a custom personally-compiled photo-storing CD has many more images than a music CD, and has no current methodology for marking its contents in a manner that facilitates navigation within.

Clearly, photo-CD enthusiasts need a way to easily catalog and identify what images a particular individualized CD holds for future reference. Previous attempts to address this problem have been to affix some form of paper label with the table of photo-contents onto the sleeve or box in which the CD is packaged. However, over time, the association, or matching, of a CD with its cover breaks down. CDs tend to get separated from their sleeves, thereby separating from their table of contents. People want to handle and use these inexpensive consumer products without undue care.

SUMMARY OF THE INVENTION

Digital photo enthusiasts tend to accumulate many digital pictures over time, such that they may elect to archive them in albums on disc-based media or "CDs". Users need to identify which CD contains which album, and therefore which pictures. The present invention provides a Web-based system implementing a methodology that allows a customer to easily archive multiple albums that are on-line onto a CD along with a personalized table of contents printed onto the CD itself. This user-friendly index of the digital images within the CD saves the user from having to load the CD in a CD drive to be able to determine which pictures it contains.

The working environment of the system includes a user's browser, a photo Web site's server system, a user-definition-to-XML module, an index sizing module, an XML-to-label-image converter, a CD-Remote module, a CD-positioning robot, a CD "burner" (i.e., writer), and a label printer. The environment includes connectivity to the Internet. Operation occurs as follows. A user employs his or her browser (e.g., Microsoft Internet Explorer) to interact with the photo Web site connected by the Internet. The user-definition-to-XML module, which runs in the Web server, is the interface for the user to select the digital photos to be archived or stored (i.e., "burned") into a target CD, and to design the TOC label that will be printed onto that CD. The user-definition-to-XML module allows the user, employing the browser, to select a desired table of contents (TOC) configuration (e.g., based on specification of album title and/or photo-facsimile indicia).

The user-definition-to-XML module coordinates with the index sizing module to ensure that the user is not attempting to overload the capacity of the printable surface area on the CD. For example, the maximum number of standard thumbnail images that can be imprinted onto the surface area of a CD is about 24 (e.g., arranged as two concentric circles; the inner circle allowing for a maximum of eight thumbnail images, and the outer circle able to handle 16). If the user chooses to use the option for both thumbnail images and an album title to accompany each image, the maximum number of TOC items is typically less than 24. Calculation of the surface area required for each image and/or text label can be determined simply by computing the dimensions of a bounding box that bounds each image and/or text label. A bounding box for an image, for instance, can be calculated based on the pre-existing and known dimensions of the image. A bounding box for a text label can be calculated based on font metrics known about the text label (which are available from the underlying operating system, such as Windows); see, e.g., Petzold, C., *Programming Windows*, Fifth Edition, Microsoft Press, 1999, especially Chapter 17: "Text and Fonts", the disclosure of which is hereby incorporated by reference. The index sizing module monitors the status of the unused capacity of the label space as the user adds more items to the TOC being created. The index sizing module communicates this information to the user-definition-to-XML module, which notifies the user if the TOC is full or if the binary image data being archived exceeds the capacity of a CD. The index sizing module also converts the location, dimensions, and rotation information into XML.

When the user completes the selection of the images for archiving and specifies the option (and titles) for the TOC, the user-definition-to-XML module converts all the user-specified TOC configuration information to XML, which it passes to the XML-to-label-image converter. The XML-to-label-image converter transforms the XML data and the associated thumbnail images into a single bitmap image of the TOC sized to the proportions of the target CD disk. The bitmap image may be created in any suitable image format for a desired deployment, including lossless compressed (e.g., compressed TIFF, PCX, GIF, compressed BMP, or the like), lossy compressed (e.g., JPEG, JPEG 2000, or the like), or uncompressed (e.g., uncompressed TIFF, uncompressed BMP, or the like) formats. The XML-to-label-image converter ensures symmetry in the layout of the TOC items on the circular disk within the boundaries of the maximum printable area. The user-definition-to-XML module displays a WYSIWYG representation of the TOC label, generated by the XML-to-label-image converter, on the user's browser screen, asking for verification and approval of the final TOC for this particular CD.

The CD-Remote module notifies the CD-positioning robot, the CD burner, and the label printer, that the system has a list of full-size or photo display size images, as well as the single bitmap image of the TOC, ready for producing a CD. The photo service hosting the photo Web site maintains the full-size images of all the photographs in the albums for further e-commerce business transactions, although the user normally experiences only the photo display size copies during on-line viewing. The user may elect to archive the photo display size images or the full-size images onto a CD. However, the typical preference is to archive the full-size format. The photo service burns the albums onto a new CD, and prints the image configured with the custom TOC onto the other side of the CD.

After computation of the final label image for the graphic TOC, the label itself may be affixed to the CD using conventional CD burning and printing equipment. For example Microtech Systems, in Belmont, Calif., provides a complete hardware/software system for burning the binary data (archived images) onto the CD, printing the specified label directly onto the non-data side of the CD, and operating the CD-positioning robot that moves the CD disk between the burner and the printer at the appropriate time.

The CD-Remote module pre-masters the binary data for the full-size or photo display size images being archived into a target image file format, such as JPEG, JPEG 2000, or ISO-sanctioned file format that is appropriate for CD storage systems. The CD-Remote module supervises the TOC printing and binary data burning of the CD, as well as coordinates the CD-positioning robot to synchronize with the CD burner and the label printer. Burning and printing of a single personalized TOC takes about five minutes per photo-storing CD, with minor modification of that equipment to accommodate the graphic TOC image as described above.

GLOSSARY

Figure 1:
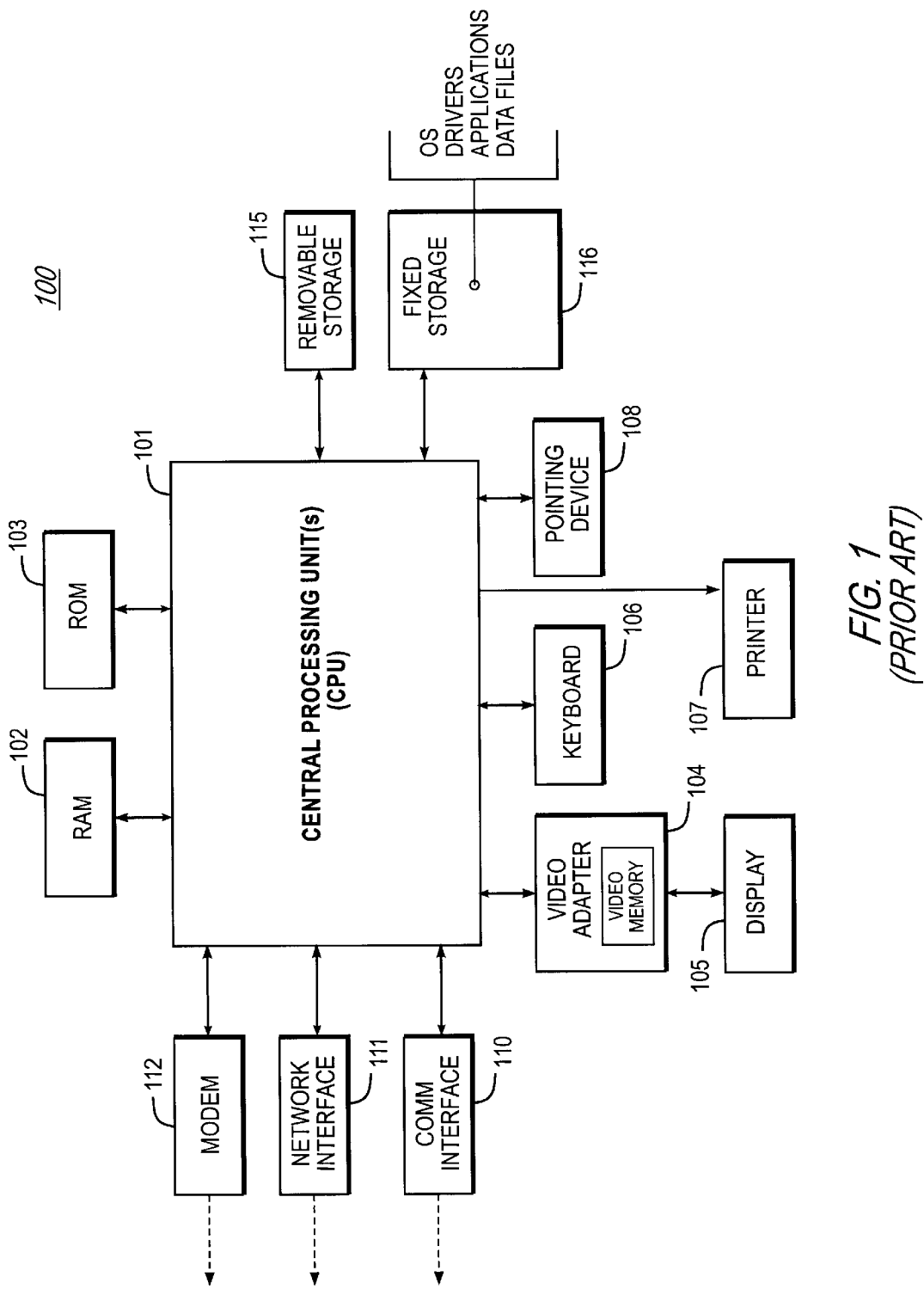
FIG. 1 is a block diagram of a computer system in which the present invention may be embodied.

CD: Short for Compact Disc. Examples of CDs include CD-ROM, CD-R, CD-RW, and Photo CD. For sake of simplification, "CD" is used to refer generally to all disc-based media, including both compact disc and DVD.

CD-R: Short for Compact Disc-Recordable drive, a type of disk drive that can create CD-ROMs and audio CDs. This allows users to "master" a CD-ROM or audio CD for publishing.

CD-ROM: Abbreviation of Compact Disc-Read-Only Memory. A type of optical disk capable of storing large amounts of data—up to 1 GB, although the most common size is 650 MB (megabytes). CD-ROMs are particularly well-suited to information that requires large storage capacity, including large software applications, graphics, sound, and video.

CD-RW: Short for CD-ReWritable disk, a type of CD disk that enables the user to write onto it in multiple sessions. One of the problems with CD-R disks is that the user can only write to them once. With CD-RW drives and disks, the user can treat the optical disk just like a floppy or hard disk, writing data onto it multiple times.

Disc: Alternative spelling of disk. Disc is often used for optical discs, while disk generally refers to magnetic discs.

DVD: Short for Digital Versatile Disc or Digital Video Disc, a new type of CD-ROM that holds a minimum of 4.7 GB (gigabytes), enough for a full-length movie. The DVD specification supports disks with capacities of from 4.7 GB to 17 GB and access rates of 600 KBps to 1.3 MBps. One of the best features of DVD drives is that they are backward-compatible with CD-ROMs. This means that DVD players can play old CD-ROMs, CD-I disks, and video CDs, as well as new DVD-ROMs. Newer DVD players can also read CD-R disks.

DVD-RAM: A new type of rewritable compact disc that provides much greater data storage than today's CD-RW systems. The specifications for DVD-RAMs are still being formulated by the DVD Consortium. Meanwhile, a competing group of manufacturers led by Hewlett-Packard, Philips and Sony, have come up with a competing standard called DVD+RW. Whereas the DVD-RAM standard supports 2.6 GB per disk side, DVD+RW supports 3 GB per side.

DVD-ROM: A new type of read-only compact disc that can hold a minimum of 4.7 GB (gigabytes), enough for a full-length movie. The DVD-ROM specification supports disks with capacities of from 4.7 GB to 17 GB and access rates of 600 KBps to 1.3 MBps. One of the best features of DVD-ROM drives is that they are backward-compatible with CD-ROMs.

This means that DVD-ROM players can play old CD-ROMs, CD-I disks, and video CDs, as well as new DVD-ROMs. Newer DVD players can also read CD-R disks.

Full-size (digital) pictures: A full-size digital picture used for e-commerce at photo Web sites is a compressed (JPEG) format wherein full-size raw digital images are converted to representations at a maximum resolution of typically 1536-by-1024 pixels. Full-size digital images are maintained in a Joint Photographic Experts Group (JPEG) format. The digital images have an aspect ration of 3:2. Later, these full-size images may be transformed down to lower resolutions for purposes of speedy display/delivery across the Internet. Currently, the Internet-shared individual picture, a photo display size, has a resolution of 460-by-306, and the roll of pictures is represented by a group of thumbnail images each having a 96-by-64 resolution.

ISO: ISO is short for International Organization for Standardization. Founded in 1946, ISO is an international organization composed of national standards bodies from over 75 countries. For example, ANSI (American National Standards Institute) is a member of ISO. ISO has defined a number of important computer standards, the most significant of which is perhaps OSI (Open Systems Interconnection), a standardized architecture for designing networks.

JPEG: JPEG is an acronym for Joint Photographic Experts Group. JPEG is a lossy compression technique for color images. Although it can reduce file sizes to about 5% of their normal size, some detail is lost in the compression.

Photo display size digital image: Photo Web sites use a medium resolution format best suited for distributing individual photographs across the Internet on-demand, typically using a resolution frame of around 460-by-306 pixels. The photo display size resolution is optimal for addressing two competing concerns. One is to provide sufficient resolution for the user to review his or her photograph or to manipulate a portion of the photograph (enhancement) when ordering additional photo printing during an on-line e-commerce experience. The other is to minimize the data necessary to represent a photograph that would minimize the latency when transporting a digital image across the Internet in real-time. Photo display size digital images are maintained in a Joint Photographic Experts Group (JPEG) format.

Photo CD: A standard type of compact disc developed by Eastman Kodak for the platform-independent storage and retrieval of images captured by film and digitized by a film scanner. It is used by photofinishers to record photographic images onto compact disc. Kodak offers two categories of Photo CD disc formats designed to meet different customer needs: Master discs (which include Photo CD Master discs and Pro Photo CD Master discs) and the Photo CD Portfolio II disc format. The Photo CD Master disc and Pro Photo CD Master disc formats can contain only images that originated on film, and that have been digitized using Kodak scanning systems and software. Images on these discs serve as "digital negatives," providing a convenient, low-cost way to bring photographs into digital imaging applications.

Thumbnail: The lowest digital image resolution used by photo Web sites further compresses full-size JPEG images to a "thumbnail" size—typically and arbitrarily 96-by-64 pixels—to represent several photographs from an on-line roll or album when displayed. A group of thumbnails can quickly be transmitted across the Internet. These thumbnail-size images, although of very low fidelity, provide sufficient pictorial information for recognizing a particular photograph from among a group of them on a computer monitor.

TIFF: Acronym for tagged image file format, one of the most widely supported file formats for storing bitmapped images on personal computers (both PCs and Macintosh computers). Other popular formats include BMP, GIF, and PCX.

TOC: TOC is an acronym for "table of contents."

XML: Extensible Markup Language (XML) is a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (URL is http://www.w3.org), the disclosure of which is hereby incorporated by reference. The specification is also currently available on the Internet at the URL, http://www.w3.org/TR/REC-xml.

WYSIWYG: WYSIWYG stands for "what you see is what you get." A WYSIWYG application is one that enables you to see on the display screen exactly what will appear when a document (or label) is printed. This differs, for example, from word processors that are incapable of displaying different fonts and graphics on the display screen even though the formatting codes have been inserted into the file. WYSIWYG is especially popular for desktop publishing.

DETAILED DESCRIPTION OF A PREFERRED EMBODIMENT

The following description will focus on the presently-preferred embodiment of the present invention that is implemented in an Internet-connected environment, which connects personal computers (e.g., running under Windows ME) to server computers (e.g., running under Windows 2000). The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation.

Computer-Based Implementation

A. Basic System Hardware (e.g., for Desktop and Server Computers)

Portions of the present invention include computer-implemented methods that may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) 101 coupled to a random-access memory (RAM) 102, a read-only memory (ROM) 103, a keyboard 106, a pointing device 108, a display or video adapter 104 connected to a display device 105, a removable (mass) storage device 115 (e.g., floppy disk, CD-ROM, CD-R, CD-RW, or the like), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device 105. In this manner, these input devices support manual user input for any process running on the system.

The computer system 100 displays text and/or graphic images and other data on the display device 105. Display device 105 is driven by the video adapter 104, which is interposed between the display device 105 and the system 100. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include an RS-232 serial port, a Universal Serial Bus (USB) interface, or the like. Devices that will be commonly-connected locally to the comm interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

The above-described system 100 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally (e.g., browser) that, in turn, is connected to a "server" (e.g., Web server) or remote device having information and/or services of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 2:
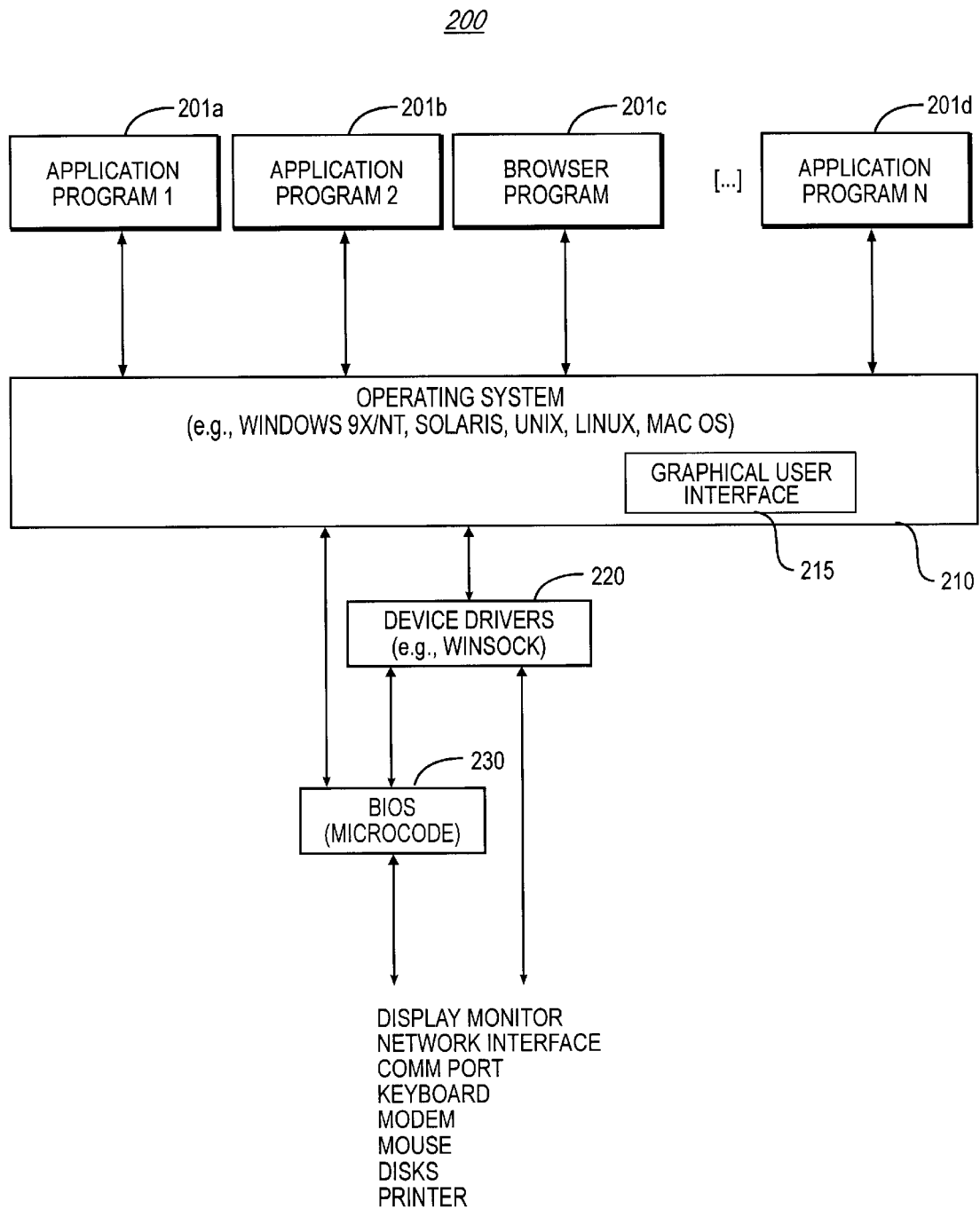
FIG. 2 is a block diagram of a software system for controlling the operation of the computer system of FIG. 1.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. In the preferred embodiment, the client application software 201 includes a browser program (e.g., browser program 201c), such as Microsoft Internet Explorer (available from Microsoft Corporation of Redmond, Wash.).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows ME, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

Browser-Based Labeling of Photo Compact Discs with a Photo-Facsimile Table of Contents A. Overview Digital photo consumers currently have to deal with voluminous collections of personal pictures temporarily stored at commercial Internet sites. The retrieval/viewing issue is the same on-line as it is with the personal photo-storing CD scenario. The atomic level of cataloging personal pictures on-line is the "album." An on-line photo album is simply a set of photos that are grouped together, and assigned some meaningful descriptor or album title (e.g., "Baby's first steps"). Users are partially able to associate an album with the photos therein. Users define their on-line albums' names to personalize and strengthen that association. Examples of commercial photo Web sites supporting on-line albums include Yahoo! Photos, Shutterfly.com, and Kodak PhotoNet, as well as a host of others.

The commercial photo sites are able to further augment the user's recollection of what is in an album by providing a quick and easy previewing mechanism: both an album title (as text) as well as a table of contents that uses photo facsimiles to describe the album's contents. To catalog an on-line album for the user on-demand, the server-side software, interacting with the user in his or her browser, quickly renders a group of miniature very-low-resolution representations of the pictures within a selected album. These are typically so-called "thumbnail" images, each a version of a full-size picture transformed down to a format of typically 96-by-64 pixels. Thumbnails involve so little data that a dozen of these compressed pictures download to the user almost instantly, offering a quick pictorial scan of an album's photographic contents. Each thumbnail, although of very low fidelity, provides sufficient pictorial information to recognize its corresponding full-size photograph from among a group of thumbnails on a computer monitor.

The use of thumbnails as a visual aid for indexing the contents of an album would also be especially useful for rapidly identifying the contents of a photo-storing CD, which potentially holds many more pictures than does a single on-line album. In fact, a photo-storing CD has the capacity to hold many albums, much like a commercial photo Web site (i.e., an e-commerce site). For some people, album titles are sufficient for associating their contents. However, because CD storage is intended for longer-term archiving than the temporary on-line services' storage, over time the user's recollection association between merely an album name and its contents degenerates. Some people need a visual element for associating with the contents of an album.

The methodology of the present invention enables automated creation of a graphic table of contents (i.e., one with graphical elements, with or without text labels or titles) for labeling a disc, by employing both thumbnail images and user-specified indicia (e.g., album titles), fashioned after the commercial on-line photo services' album cataloging technique, thereby providing an improved technique for personalizing the table of contents (TOC) for a user's photo-storing CD. In the currently-preferred embodiment, this text/image-based TOC for an entire CD's worth of albums is mapped to a single label image, which in turn is then stamped onto the non-data side of the CD, where CD labeling traditionally goes. The system can print the TOC directly onto the plastic CD or onto an adhesive label (e.g., paper or plastic label) that attaches to the CD.

More particularly, the methodology of the present invention allows a user to interactively customize both the format and the configuration of the TOC via the Web. Server-side software is provided on the commercial photo Web site to prompt the user to select whichever albums are to be archived onto a target CD, and also set configuration options for the corresponding TOC. The following are the options for how a user may list the albums that are copied onto a CD:

(1) Using existing album titles.

(2) Using existing album titles, each accompanied by a single thumbnail of the first photo in that album.

(3) Using existing album titles, each accompanied by a user-specified thumbnail from within that album.

(4) Creating a unique title for each album that is put on the CD.

(5) Selecting pictures from among many on-line albums, putting copies of those selected images into a new (temporary) album(s) that will be archived on a CD, and indexing its contents using any of the other previously-described options.

Figure 3:
FIG. 3 is a graphic representation of a CD using only album titles for the TOC.

FIG. 3 is a graphic representation of a CD 300 using only a simplistic TOC, based on text-based indicia (e.g., album titles) only. The CD 300 includes a maximum printable area, defined by the disc's surface area ($Pi(r_{disc})^2$) remaining after excluding the surface area of the hole/hub ($Pi(r_{hub})^2$) in the CD's center, together with applicable print margins. Based on the maximum printable area, one or more album titles (e.g., album title 350) may be printed on the CD. Each album title may be the existing album title at the photo Web site or the user may have modified it for saving on the CD. In the CD illustrated in FIG. 3, four personalized album titles are shown; however, the number that may actually be printed is only limited by the maximum printable area.

Figure 4:
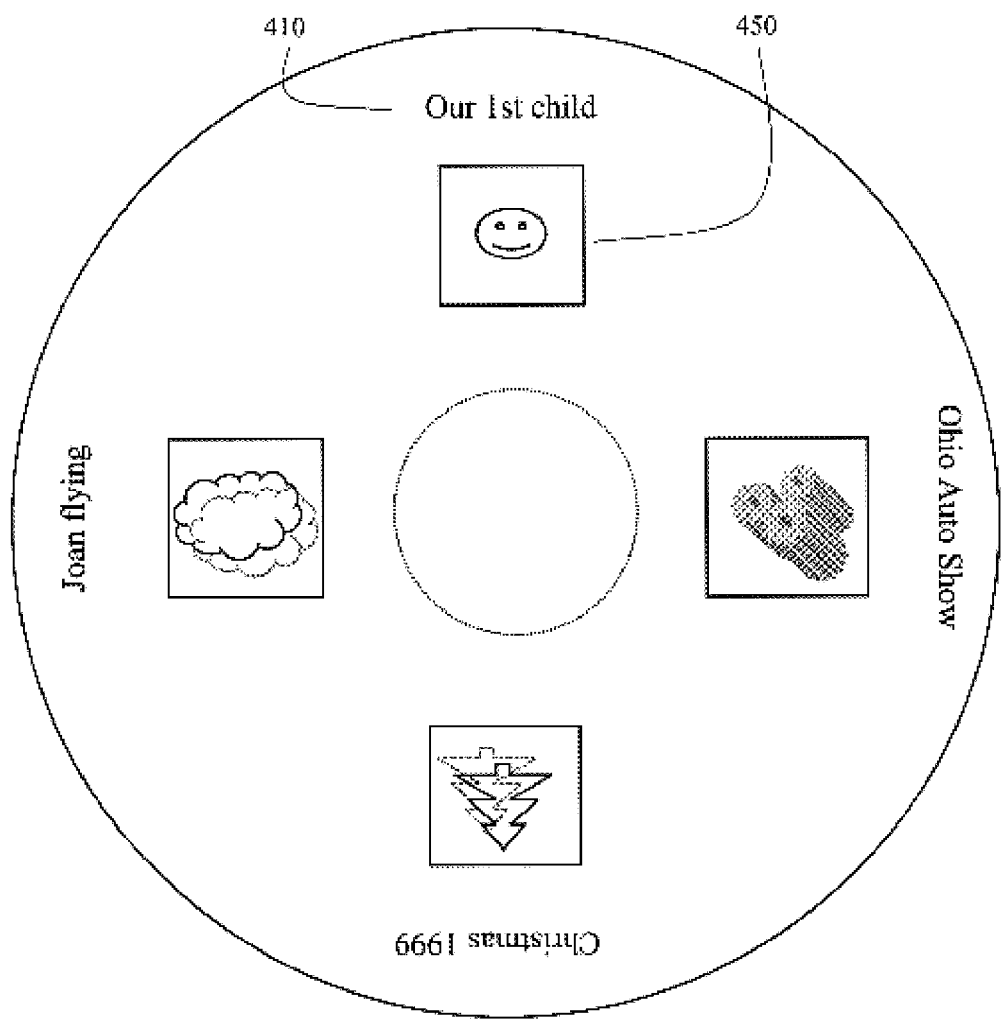
FIG. 4 is a graphic representation of a CD using album titles, each accompanied by a single thumbnail image of one photograph in that album for the table of contents.

FIG. 4 is a graphic representation of a CD 400 employing a graphic TOC, based on both text-based indicia (e.g., album titles) and graphic or pictorial indicia (e.g., photo-facsimiles). As shown, for example, CD 400 employs album titles, each accompanied by a single thumbnail image of one photograph in that album for the TOC. FIG. 4 includes four album titles (e.g., album title 410) and accompanying thumbnail images (e.g., thumbnail image 450). If desired, the accompanying thumbnail images may also include images other than those of the photographs, such as stock or "clipart" images. The CD's TOC may be organized as concentric rings of album listings in this format. FIG. 4 illustrates four personalized album titles/thumbnails; however, the maximum number is again limited only by the maximum printable area.

B. System Components of Browser-Based Labeling

Figure 5:
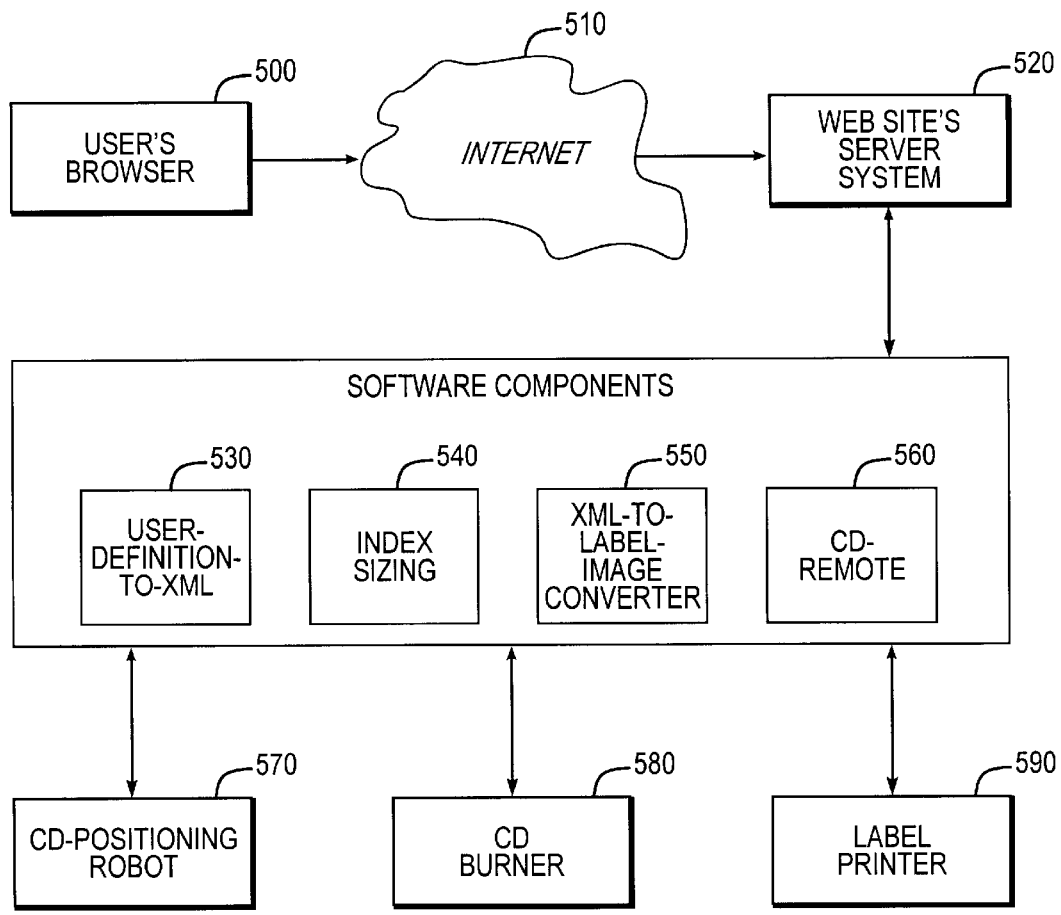
FIG. 5 is a high-level block diagram illustrating the configuration of the multiple components in the system.

FIG. 5 is a high-level block diagram illustrating the configuration of the multiple components in the system. As shown in FIG. 5, the working environment of the system includes a user's browser 500, a photo Web site's server system 520, a user-definition-to-XML module 530, an index sizing module 540, an XML-to-label-image converter 550, a CD-Remote module 560, a CD-positioning robot 570, a CD "burner" (i.e., writer) 580, and a label printer 590. Connectivity to the Internet is shown at 510. Each system component will be described in further detail.

As shown in FIG. 5, the user uses the browser 500 (e.g., Microsoft Internet Explorer) to interact with the photo Web site's server system 520 connected by the Internet 510. The user-definition-to-XML module 530, which runs in the Web site's server system 520, is the interface for the user to select the digital photos to be stored ("burned") into a target CD, and to design the TOC label that will be printed onto that CD. The user-definition-to-XML module 530 allows the user, employing the browser 500, to select a desired TOC configuration (e.g., based on specification of album title and/or photo-facsimile indicia).

The user-definition-to-XML module 530 coordinates with the index sizing module 540 to ensure that the user is not attempting to overload the capacity of the printable surface area on the CD. For example, the maximum number of standard thumbnail images that can be imprinted onto the surface area of a CD is about 24 (e.g., arranged as two concentric circles; the inner circle allowing for a maximum of eight thumbnail images, and the outer circle able to handle 16). If the user chooses to use the option for both thumbnail images and an album title to accompany each image, the maximum number of TOC items is typically less than 24. Calculation of the surface area required for each image and/or text label can be determined simply by computing the dimensions of a bounding box that bounds each image and/or text label. A bounding box for an image, for instance, can be calculated based on the pre-existing and known dimensions of the image. A bounding box for a text label can be calculated based on font metrics known about the text label (which are available from the underlying operating system, such as Windows); see, e.g., Petzold, C., *Programming Windows*, Fifth Edition, Microsoft Press, 1999, especially Chapter 17: "Text and Fonts", the disclosure of which is hereby incorporated by reference. The index sizing module 540 monitors the status of the unused capacity of the label space as the user adds more items to the TOC being created. The index sizing module 540 communicates this information to the user-definition-to-XML module 530, which notifies the user if the TOC is full or if the binary image data being archived exceeds the capacity of a CD. The index sizing module 540 also converts the location, dimensions, and rotation information into XML.

When the user completes the selection of the images for archiving and specifies the option (and titles) for the TOC, the user-definition-to-XML module 530 converts all the user-specified TOC configuration information to XML, which it passes to the XML-to-label-image converter 550. At 550, the XML-to-label-image converter transforms the XML data and the associated thumbnail images into a single bitmap image of the TOC sized to the proportions of the target CD disk. The bitmap image may be created in any suitable image format for a desired deployment, including lossless compressed (e.g., compressed TIFF, PCX, GIF, compressed BMP, or the like), lossy compressed (e.g., JPEG, JPEG 2000, or the like), or uncompressed (e.g., uncompressed TIFF, uncompressed BMP, or the like) formats. The XML-to-label-image converter 550 ensures symmetry in the layout of the TOC items on the circular disk within the boundaries of the maximum printable area. The user-definition-to-XML module 530 displays a WYSIWYG representation of the TOC label, generated by the XML-to-label-image converter 550, on the user's browser screen 500, asking for verification and approval of the final TOC for this particular CD.

The CD-Remote module 560 notifies the CD-positioning robot 570, the CD burner 580, and the label printer 590, that the system has a list of full-size or photo display size images, as well as the single bitmap image of the TOC, ready for producing a CD. The photo service hosting the photo Web site maintains the full-size images of all the photographs in the albums for further e-commerce business transactions, although the user normally experiences only the photo display size copies during on-line viewing. The user may elect to archive the photo display sizes images or the full-size images onto CD. However, the typical preference is to archive the full-size format. The photo service burns the albums onto a new CD, and prints the image configured with the custom TOC onto the other (i.e., non-data) side of the CD.

After computation of the final label image for the graphic TOC, the label itself may be affixed to the CD using conventional CD burning and printing equipment. For example, the CD-positioning robot 580, CD burner 580, and label printer 590 may be provided by Microtech Systems' ImageMaker or Burnie production systems, available from Microtech Systems of Belmont, Calif. These systems include a complete hardware/software system for burning the binary data (archived images) onto the CD, printing the specified label directly onto the non-data side of the CD, and operating the CD-positioning robot that moves the CD disk between the burner and the printer at the appropriate time. A standalone label printer may be used, if desired. For instance, the Rimage Prism Thermal CD Printer, available from Rimage Corporation of Minneapolis, Minn., may be employed for this purpose. Alternatively, the Signature IV CD Color Printer from Primera Technology of Plymouth, Minn. may be employed. In the currently-preferred embodiment, the Microtech Systems Burnie system is adapted to receive the above-mentioned graphic TOC image.

The CD-Remote module 560 pre-masters the binary data for the full-size or photo display size images being archived into a target image file format, such as JPEG, JPEG 2000, or ISO-sanctioned file format that is appropriate for CD storage systems. The CD-Remote module 560 supervises the TOC printing and binary data burning of the CD, as well as coordinates the CD-positioning robot 570 to synchronize with the CD burner 580 and the label printer 590. Burning and printing of a single personalized TOC takes about five minutes per photo-storing CD, with minor modification of that equipment to accommodate the graphic TOC image as described above.

C. Detailed Operation

Figure 6:
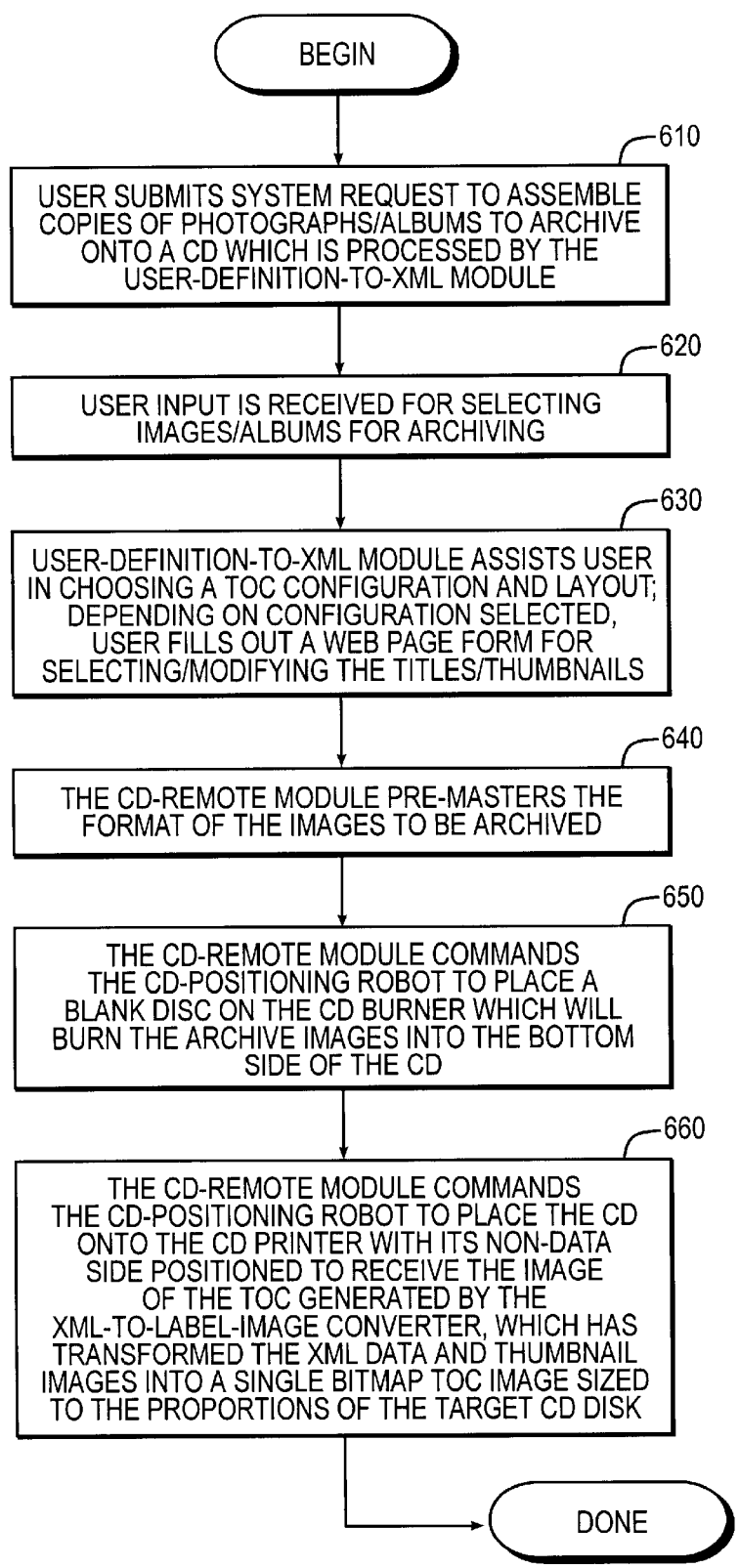
FIG. 6 is a flow chart illustrating the sequential steps in the interaction among the user and the components in the system.

FIG. 6 is a flow chart summarizing the sequential steps in the interaction among the user and the components in the system of the present invention. Although the detailed discussion which follows focuses on use of graphic elements or images within the TOC, those skilled in the art will appreciate that the same can be done with the album titles (or other descriptive text) that the user defines. The specific elements that are used to generate the TOC image can be either chosen by the user, automatically chosen by the software of the system, or a combination of both. Thus, the generated TOC image may comprise images (e.g., thumbnails), album titles (or other text), or both, which are either specified by the user or automatically specified by the software. In instances where the user wishes to select the specific elements used to generate the TOC image, the software assists in the selection by automatically displaying the album titles and thumbnail images that are relevant to the particular on-line albums (or portions thereof) that the user desires to archive onto disc. The user may select from these automatically presented elements or may indicate other user-specified images and/or text, including specifying arbitrary images and/or text, if desired.

At step 610, the user submits a request for the system to assemble copies of his or her on-line photographs (or albums) to archive onto a CD. This request is processed by the user-definition-to-XML module. At step 620, the user input is received for selecting the images and/or albums for archiving. At step 630, the user-definition-to-XML module assists the user in choosing a TOC configuration option and in arranging the layout for the TOC. The software automatically displays the album titles and thumbnail images that are relevant to the particular on-line albums (or portions thereof) that the user desires to archive onto disc. The user may select from these automatically presented elements or may indicate other user-specified images and/or text, including specifying arbitrary images and/or text, if desired. In this manner, the specific elements that are used to generate the TOC image can be either chosen by the user, automatically chosen by the software of the system, or a combination of both. Depending upon the TOC configuration selected, the user fills out a form on the Web page drop-down single-select list form controls for selecting/modifying the titles and thumbnails. This entry form accommodates the images that are saved on the binary data side of the CD as well as the TOC items for the labeling.

As the user is readying specified albums, or portions thereof, to be copied onto a photo-storing CD, the system keeps track of how much image data is involved, warning the user should he or she be exceeding the capacity of a single CD. As the user is custom selecting the elements for the TOC items, the system keeps track of how many TOC items are involved, disallowing the user to exceed the maximum capacity. When the user indicates to the system that he or she has finished selecting the albums for archiving, the system arranges the configuration of the TOC representing the copied albums onto a single image that will be printed onto the non-data side of the CD that contains the albums of full-size photos. The user-definition-to-XML module captures all the user-specified TOC configuration information to XML.

At step 640, the CD-Remote module pre-masters the format of the images to be archived. At step 650, the CD-Remote module commands the CD-positioning robot to place a blank disc (media) on the CD burner, which will burn the archive images into the bottom side of the CD. At step 660, the CD-Remote module commands the CD-positioning robot to place the CD onto the CD printer with its non-data side positioned to receive the image of the TOC generated by the XML-to-label-image converter, which has transformed the XML data and the associated thumbnail images into a single bitmap image of the TOC sized to the proportions of the target CD disk. The surface of the non-data side of the CD uses a white background color to best accentuate the coloration of the thumbnail images.

While the invention is described in some detail with specific reference to a single-preferred embodiment and certain alternatives, there is no intent to limit the invention to that particular embodiment or those specific alternatives. For instance, the teachings of the present invention may be adapted to storage media other than disc-based ones. Accordingly, those skilled in the art will appreciate that modifications may be made to the preferred embodiment without departing from the teachings of the present invention.

What is claimed is:

1. A browser-based method for printing a graphic table of contents onto disc-shaped media, the method comprising:
    displaying at a browser information indicating images stored on-line that are available for storage on a particular disc, said images being organized on-line in one or more photo albums;
    receiving from the browser, first user input for selecting particular images from one or more photo albums to store on the particular disc;
    based on said first user input, displaying at the browser an interface allowing user configuration of a graphic table of contents for the particular disc, including displaying indicia representative of which photo albums the particular images are selected from;
    receiving from the browser, second user input specifying a particular configuration of the graphic table of contents for the particular disc, said second user input specifying that the graphic table of contents include at least some of the indicia representative of which photo albums the particular images are selected from;
    based on said second user input, automatically composing corresponding graphic elements for the graphic table of contents, for placement on one side of the particular disc, wherein said graphic elements include photo facsimile-sized digital images indicating image content stored on the particular disc; and thereafter
    printing the graphic table of contents on the particular disc, such that said graphic table of contents is imprinted onto the particular disc's surface in a manner to allow a user to determine the disc's contents without loading into a computer.

2. The method of claim 1, wherein said graphic elements include user-selected low-resolution images indicating image content stored on the particular disc.

3. The method of claim 1, wherein said graphic elements include textual information indicating image content stored on the particular disc.

4. The method of claim 1, wherein said user input is communicated to the server using HTTP protocol.

5. The method of claim 1, wherein said graphic table of contents composes graphic and text elements arranged to conform to available surface area of one side of the particular graphic disc.

6. The method of claim 1, wherein each of said graphic elements is a low-resolution copy of an image that is stored on the particular disc.

7. The method of claim 1, wherein each of said graphic elements is a predescribed fixed size when used in the graphic table of contents regardless of the user's selected configuration.

8. The method of claim 1, wherein said graphic table of contents composes a symmetrical composition of graphic and text elements arranged to conform to available surface area of one side of the particular disc.

9. The method of claim 1, wherein said graphical elements of the table of contents include facsimile-sized digital images with adjacent text titles.

10. The method of claim 1, wherein said graphical elements of the table of contents include facsimile-sized digital images without any text titles.

11. The method of claim 1, wherein said graphical elements in the graphic table of contents are distributed in a circular arrangement.

12. The method of claim 1, wherein said graphical elements in the graphic table of contents are arranged as a single circular grouping.

13. The method of claim 1, wherein said graphical elements of the graphic table of contents are arranged into multi-concentric circle groupings.

14. The method of claim 1, wherein said graphical elements in the graphic table of contents are arranged with their top-sides oriented toward an outer perimeter of the graphic table of contents.

15. The method of claim 1, wherein said graphic table of contents includes textual elements arranged with their top-sides oriented toward an outer perimeter of the graphic table of contents.

16. The method of claim 1, wherein said graphical elements of the table of contents are aligned with equivalent radian separation within each circular grouping.

17. The method of claim 1, further comprising:
in response to said first user input for selecting particular images, copying the selected particular images to the particular disc.

18. The method of claim 17, further comprising:
pre-mastering the particular images prior to copying them to the particular disc.

19. The method of claim 1, wherein said graphic table of contents is printed directly on a non-data side of the particular disc.

20. The method of claim 1, wherein said graphic table of contents is printed onto a label that is subsequently affixed to the particular disc.

21. The method of claim 20, wherein said label is a selected one of a paper label and plastic label.

22. The method of claim 1, wherein said indicia representative of which photo albums the particular images are selected from includes a pre-existing on-line album title used to represent a group of images on-line.

23. The method of claim 1, further comprising:
based on said first user input for selecting particular images, creating an archival copy of the selected particular images on the particular disc.

24. An Internet-based system for printing a graphic table of contents onto disc-shaped media, the system comprising:
a browser connected to a host computer system via the Internet, wherein said browser displays information indicating images stored on-line at the host computer system that are available for storage on a particular disc, said images being organized on-line in one or more photo albums;
a software module operating at the host computer system for creating a graphic table of contents in response to;
first user input for selecting particular images from one or more photo albums to store on the particular disc, and
second user input specifying a particular configuration of the graphic table of contents for the particular disc; and
wherein said software module automatically composes corresponding graphic elements for the graphic table of contents, for placement on one side of the particular disc, wherein said graphic elements include photo facsimile-sized digital images indicating image content stored on the particular disc, such that said graphic table of contents is imprinted onto the particular disc's surface in a manner to allow a user to determine the disc's contents without loading into a computer.

25. The system of claim 24, further comprising:
a printer for printing the graphic table of contents on the particular disc.

26. The system of claim 24, wherein said graphic elements include user-selected low-resolution images indicating image content stored on the particular disc.

27. The system of claim 24, wherein said graphic elements include textual information indicating image content stored on the particular disc.

28. The system of claim 24, wherein said user input is communicated to the host computer system using HTTP protocol.

29. The system of claim 24, wherein said graphic table of contents composes graphic and text elements arranged to conform to available surface area of one side of the particular disc.

30. The system of claim 25, wherein each of said graphic elements is a low-resolution copy of an image that is stored on the particular disc.

31. The system of claim 24, wherein each of said graphic elements is a prescribed fixed size when used in the graphic table of contents regardless of the user's selected configuration.

32. The system of claim 24, wherein said graphic table of contents composes a symmetrical composition of graphic and text elements arranged to conform to available surface area of one side of the particular disc.

33. The system of claim 24, wherein said graphical elements of the table of contents include facsimile-sized digital images with adjacent text titles.

34. The system of claim 24, wherein said graphical elements of the table of contents include facsimile-sized digital images without any text titles.

35. The system of claim 24, wherein said graphical elements in the graphic table of contents are distributed in a circular arrangement.

36. The system of claim 24, wherein said graphical elements in the graphic table of contents are arranged as a single circular grouping.

37. The system of claim 24, wherein said graphical elements of the table of contents are arranged into multi-concentric circle groupings.

38. The system of claim 24, wherein said graphical elements in the graphic table of contents are arranged with their top-sides oriented toward an outer perimeter of the graphic table of contents.

39. The system of claim 24, wherein said graphic table of contents includes textual elements arranged with their top-sides oriented toward an outer perimeter of the graphic table of contents.

40. The system of claim 24, wherein said graphical elements of the table of contents are aligned with equivalent radian separation within each circular grouping.

41. The system of claim 24, further comprising:
a CD writer for copying particular images to the particular disc.

42. The system of claim 24, wherein said graphic table of contents is printed directly on a non-data side of the particular disc.

43. The system of claim 24, wherein said graphic table of contents is printed onto a label that is subsequently affixed to the particular disc.

44. The system of claim 43, wherein said label is a selected one of a paper label and plastic label.

45. The system of claim 24, wherein said indicia representative of which photo albums the particular images are selected from includes a pre-existing on-line album title used to represent a group of images on-line.

46. A system for printing a graphic table of contents onto a particular storage media, the system comprising:

a server providing a central repository for digital images;

an on-line subsystem for:
- allowing a user to select on-line images from the central repository to be stored on the particular storage media,
- allowing the user to approve selection of elements for configuring the graphic table of contents for the particular storage media, said elements comprising photo facsimile-sized digital images indicating image content stored on the particular disc, and
- automatically composing a label image representing the graphic table of contents for the particular storage media; and a mastering subsystem for:
- storing selected images to the particular storage media; and
- labeling the particular storage media with said label image representing the graphic table of contents, such that said graphic table of contents is affixed to the particular storage media's surface in a manner that allows a user to identify without machine aid what images are contained on the storage media.

47. The system of claim 46, further comprising:

a media writing device for copying onto the particular storage media the images selected by the user.

48. The system of claim 46, wherein the selection of elements approved by the user are automatically selected, at least in part, by said on-line subsystem.

49. The system of claim 46, wherein said elements include selected combinations of graphic and text elements.

50. The system of claim 49, wherein said graphic elements comprise thumbnail images.

51. The system of claim 49, wherein said text elements comprise descriptive titles.

* * * * *